Jan. 29, 1957  E. W. MILHIZER  2,779,607
TRAILER COUPLING WITH UNIVERSAL JOINT
Filed April 19, 1954  2 Sheets-Sheet 1

Edward W. Milhizer
INVENTOR.

BY *Thomas A. O'Brien*
and *Harvey B. Jacobson*
Attorneys

Jan. 29, 1957 E. W. MILHIZER 2,779,607
TRAILER COUPLING WITH UNIVERSAL JOINT
Filed April 19, 1954 2 Sheets-Sheet 2

Edward W. Milhizer
INVENTOR.

BY
Attorneys

United States Patent Office 2,779,607
Patented Jan. 29, 1957

2,779,607

TRAILER COUPLING WITH UNIVERSAL JOINT

Edward W. Milhizer, Detroit, Mich.

Application April 19, 1954, Serial No. 424,159

5 Claims. (Cl. 280—510)

This invention relates to coupling assemblies for trailers, and has for its primary object the provision of an improved form of coupling or hitch for use between a truck and a trailer wherein the process of coupling and uncoupling will be greatly simplified.

Another object of this invention is to provide a hitch in conformity with the foregoing object which effects a universal coupling between the towing and towed vehicles and which is provided with means for lubricating the coupling.

Another object of this invention is to provide a coupling assembly which permits pivotal movement about three axes, namely, a vertical axis, a transverse horizontal axis and a longitudinal horizontal axis, permitting freedom of movement between the vehicles such as to prevent twisting, turning or tilting forces to be transmitted therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
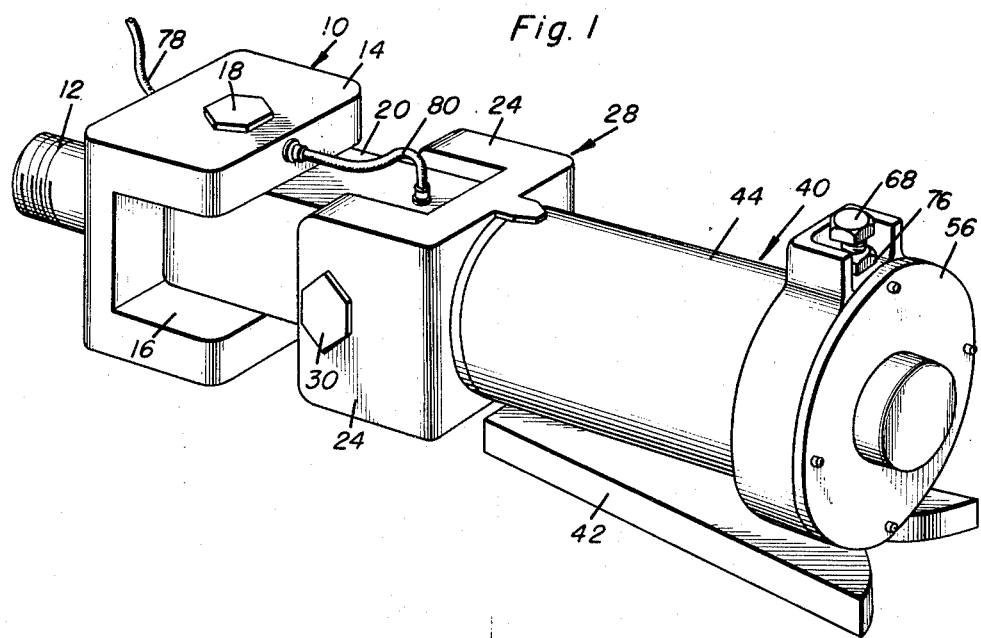
Figure 1 is a perspective view of the hitch structure.

Referring now more particularly to the drawings, and most specifically at this point to Figure 1, reference numeral 10 indicates a yoke member which is adapted to be connected to a truck or trailer through its rearwardly extending attaching shaft 12 which may be threaded for the reception of retaining nuts, in the manner shown. This yoke is provided with a pair of vertically spaced leg members 14 and 16 which are provided with vertically aligned apertures for receiving a vertical pivot pin member 18 which may preferably be in the form of a bolt. A cross-block 20 has an end portion disposed between the legs 14 and 16 through which the pivot pin extends. The other end of the block extends between a pair of horizontally spaced legs 24 and 24 of a second yoke member 28 and these legs as well as the corresponding end of the block 20 are apertured to receive a horizontal transverse pivot pin 30 such that the assembly just described forms a universal joint.

Figures 2, 3:
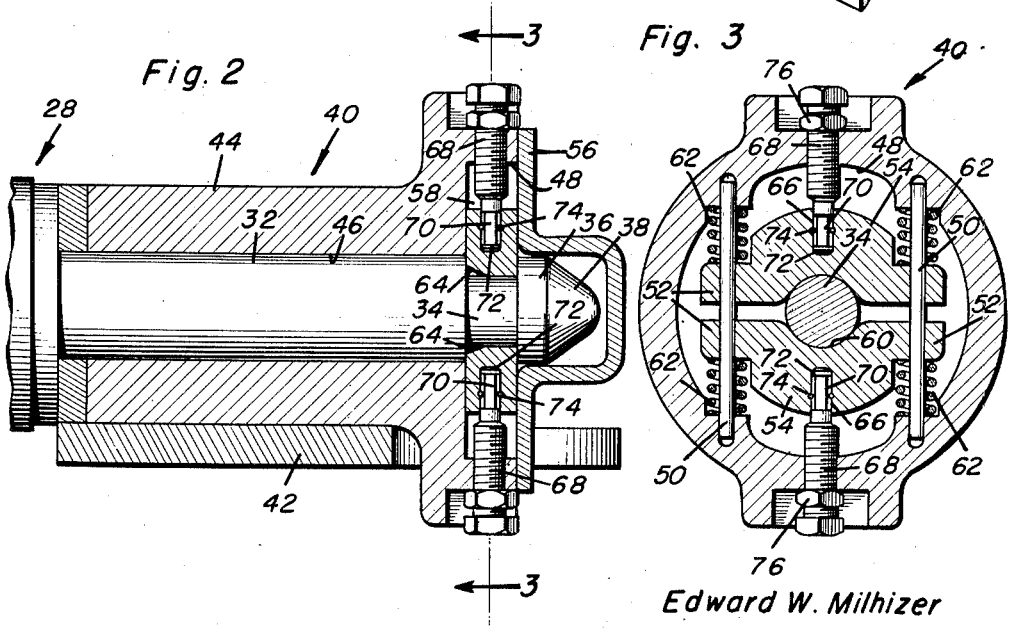
Figure 2 is a longitudinal vertical section taken through a portion of the assembly shown in Figure 1.
Figure 3 is a transverse vertical section taken substantially along the plane of section line 3—3 in Figure 2.

Referring now more particularly to Figure 2, it will be seen that a coupling shaft 32 is integrally formed with the second yoke assembly 28, and it is to be further noted that this shaft is preferably formed of uniform diameter as shown, although the shaft may be formed with a taper. Adjacent the free end of the shaft 32 is a groove forming the portion 34 of reduced diameter and presenting the enlarged head 36 at the free end of the shaft. The head terminates in a conical portion 38, the purpose of which will be presently apparent.

The above described universal joint and shaft assembly is, as has been pointed out, adapted to be attached to one vehicle of a vehicle train and forms the male coupling portion of the assembly. The assembly indicated generally by the reference character 40 forms the female coupling portion of the assembly and is adapted to be secured to the other vehicle, the plate member 42 being supplied for this purpose. Mounted on the plate 42 is the coupling element 44 which is provided with a longitudinally extending bore 46 adapted to receive the coupling shaft 32 in the manner shown most clearly in Figure 2, and the end face of this member is provided with a recess 48 which is disposed radially of and communicates with the bore 46. A pair of guide pins 50 are disposed in parallel relation within the recess on opposite sides of the bore 46 and these pins guidably receive the apertured ears 52 of latching block members 54 which are also disposed within the recess. A generally hat-shaped cover plate is removably secured to the end surface of the member 44 with its flange portion 56 forming, with the opposed surface 58 of the member 44, a chamber which slidably receives the block 54. Each of the opposed surfaces of the blocks is provided with a substantially semi-circular notch 60 to embracingly engage the portion 34 of the shaft 32 within the groove therein. Normally, the blocks 54 are maintained in contact with each other under action of the coil compression springs 62 which are interposed between the member 44 and the ears 52 of the blocks, in the manner shown most clearly in Figure 3.

Additionally, the rearward edges of the blocks at their notched portions are provided with beveled surfaces 64 which are adapted to be engaged by the conical portion 38 of the enlarged head 36 such that the blocks will be spread apart as the shaft 32 is inserted into the member 44, as will be readily apparent.

The blocks 54 are provided at diametrically opposed points thereon with blind bores 66, and the member 44 carries a pair of diametrically opposed locking bolts 68 threadedly engaged therewith and provided with reduced end portions 70 projecting into the bores 66. The extremity of each reduced end portion 70 is provided with a peripheral shoulder 72 of substantially the same diameter as the bores and within the bores are provided circumferential grooves receiving snap rings 74 such that as the locking bolts 68 are retracted from the member 44, the shoulders 72 will engage the snap rings and carry the blocks 54 therewith. In this manner, it will be readily apparent that the locking bolts may be manipulated to withdraw the blocks from within the groove in the shaft 32. At the same time, when the locking bolts are threadedly engaged inwardly to their extreme position with the shaft 32 in place, they will force the blocks 54 to remain within the groove in the shaft 32. Of course, suitable lock nuts 76 may be associated with the locking bolts.

By the above described assembly, it will be readily apparent that the truck and trailer will be coupled together and are free to move about three separate axes, namely, the axis of the vertical pin 18, the axis of the transverse horizontal pin 30, and the axis of the longitudinal shaft 32. Thus, any conceivable misaligned relation between the longitudinal axes of the two vehicles will not tend to transmit forces form one vehicle to the other which would tend to create hazardous driving conditions.

For the purpose of lubricating the pivotal connections between the various pins 18 and 30 and the yoke members 10 and 28 as well as the cross-block 20, a suitable oil tank (not shown) is to be mounted on one of the vehicles and connected by means of a line 78 to the yoke 10 which is provided with suitable passageways to lubricate the pin 18. This passageway further connects to a line 80 extending between the first yoke 10 and the cross-block 20 to lubricate the transverse horizontal pivot pin 30, as will be readily apparent.

Figure 4:
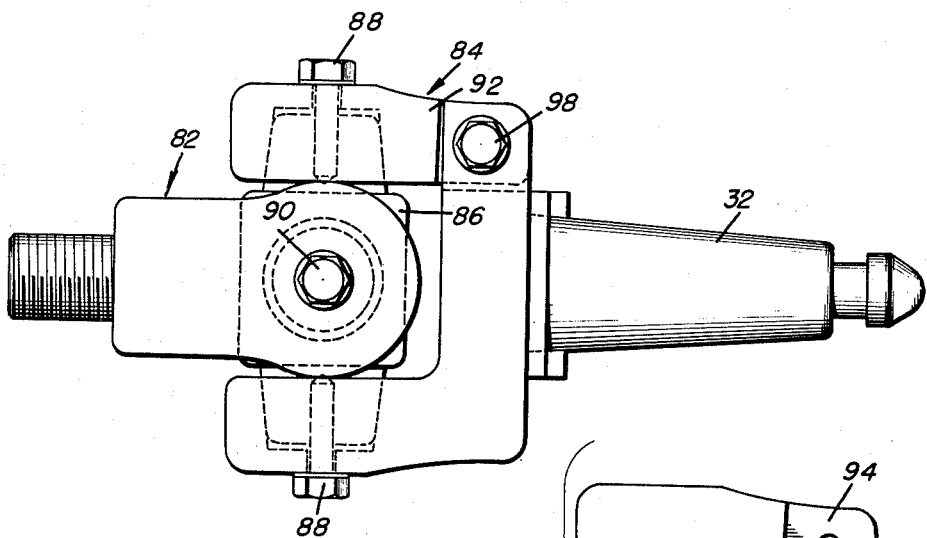
Figure 4 is a plan view of a modified form of hitch.
Figure 5:
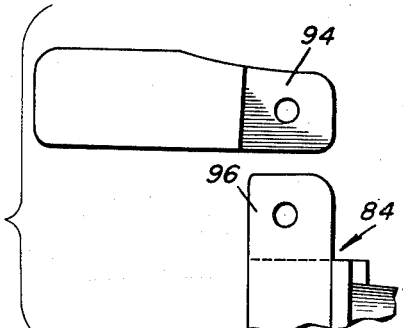
Figure 5 is an exploded view of a portion of the assembly shown in Figure 4.
Figure 6:
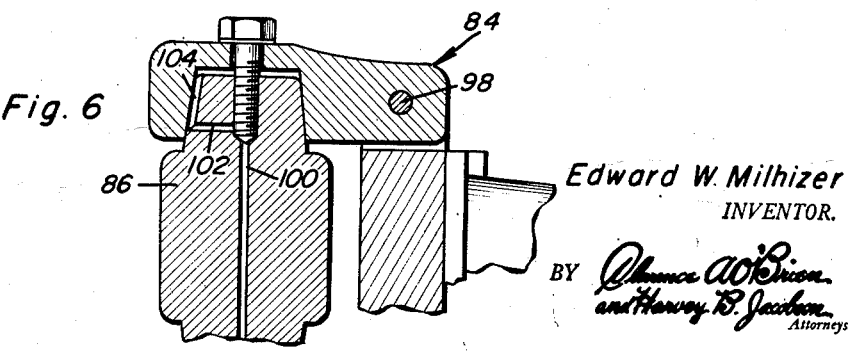
Figure 6 is a sectional view showing a portion of the assembly shown in Figure 4.

Referring now more particularly to Figures 4–6 wherein a modified form of universal joint assembly is shown, it will be seen that this assembly includes a first yoke member 82 and a second yoke member 84 connected by means of the cross-block 86, the yokes carrying the various pivot pin bolt members 88 and 90 for effecting the universal joint. One leg 92 of the yoke member 84 is formed separately therewith and has an ear 94 disposed between furcations 96, all being apertured to receive a securing element 98, in the manner shown. In this manner, the single fastener 98 may be removed to disassemble the yoke assembly 84 from the remainder of the universal joint assembly.

As seen most clearly in Figure 6, the cross-block 86 is provided with passageways 100, 102 and a groove 104 for lubricating the various mating surfaces between the cross-block and the yoke assemblies.

Figure 7:
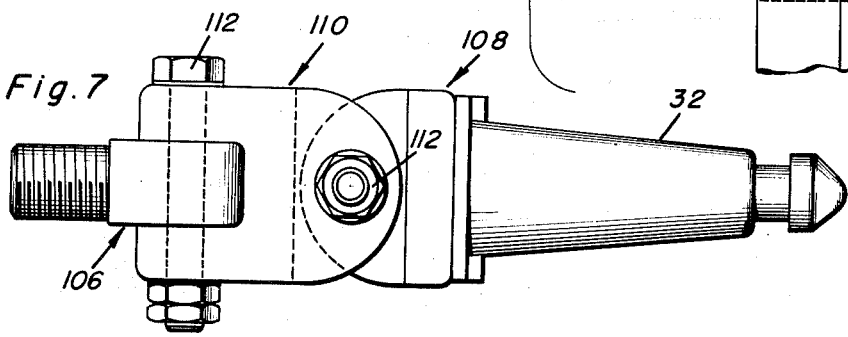
Figure 7 is a plan view of a further modified form of hitch.

Referring now more particularly to Figure 7, a still further modified form of universal joint assembly is shown which incorporates a first bearing member 106 and a second bearing member 108, interconnected by the double ended yoke assembly 110. Right angularly disposed pivot pin members 114 and 114 effect the universal joint, and this assembly may be provided with lubricating means similar to that described in connection with the form of the invention shown in Figure 1.

It is to be understood that this invention is primarily adapted for use in conjunction with trailers particularly of the four- and eight-wheel type and that the plate 42 may be secured between the V-tongue of such trailers or mounted on top or underneath such tongue. Or, if desired, the plate 42 may be secured directly to a truck on the undersurface at the rear end thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A trailer hitch comprising a universal joint assembly including an elongated coupling shaft, said shaft having a circumferential groove adjacent its free end presenting an enlarged head thereat, a female coupling element having a longitudinal bore therethrough receiving said shaft, said coupling element having a radial recess communicating with its bore, a pair of transverse parallel guide pins disposed within said recess on opposite sides of said bore, a pair of latching blocks including oppositely disposed semi-circular notches slidably disposed in said recess and projectible within the groove in said shaft, said blocks having laterally projecting apertured ears receiving said guide pins, compression springs concentrically disposed on said guide pins and engageable between said ears and recess for urging the blocks together and a pair of oppositely disposed locking bolts carried by said coupling element and engaging said blocks to maintain the same within the groove in said shaft, said bolts including means for urging the blocks away from each other for permitting the release of the shaft therebetween.

2. A trailer hitch comprising a universal joint assembly including an elongated coupling shaft, said shaft having a circumferential groove adjacent its free end presenting an enlarged head thereat, a female coupling element having a longitudinal bore therethrough receiving said shaft, said coupling element having an enlarged recess at one end extending radially with respect to its bore and communicating therewith, a cover member secured to said one end of the coupling element, a pair of transverse, parallel guide pins disposed within said recess at opposite sides of said bore, a pair of latching blocks including oppositely disposed semi-circular notches slidably disposed within said recess in engagement with the inner surface of said cover member and a portion of the surface defining said recess opposed to the first mentioned surface, said latching blocks having laterally projecting apertured ears receiving said guide pins and being projectible within the groove in said shaft compression springs concentrically disposed on said guide pins and engageable between said ears and recess for urging the blocks together, and a pair of oppositely disposed locking bolts carried by said coupling element and engaging said block to maintain the same within the groove in said shaft, said bolts including means for urging the blocks away from each other for permitting release of the shaft therebetween.

3. The combination of claim 1 wherein said universal joint assembly includes first and second yoke members and a pivot block extending therebetween, said shaft being formed integrally with one of said yoke members, a vertical pivot pin extending through said first yoke and one end of said block, a horizontal pivot pin extending through said second yoke and the other and of said block, and means for lubricating the pivotal connections between said pins and said yokes.

4. The combination of claim 1 wherein said universal joint assembly includes first and second yoke members and a pivot block extending therebetween, said shaft being formed integrally with one of said yokes, vertical pivot pins connecting said block with one of said yokes, horizontal pivot pins connecting said block with the other of said yokes, and means for lubricating the pivotal connections between said pins and said yokes.

5. The combination of claim 1 wherein said universal joint assembly includes first and second bearing members and a double ended yoke member extending therebetween, said shaft being formed integrally with one of said bearing members, a vertical pivot pin extending through one end of said yoke member and one of said bearing members, a horizontal pivot pin extending through the other end of said yoke member and the other of said bearing members, and means for lubricating the pivotal connections between said pins and said yoke member.

References Cited in the file of this patent

UNITED STATES PATENTS

| | | |
|---|---|---|
| 2,027,499 | Tully | Jan. 14, 1936 |
| 2,133,065 | Weber | Oct. 11, 1938 |
| 2,435,019 | Scott | Jan. 27, 1948 |
| 2,457,885 | Gatch | Jan. 4, 1949 |
| 2,605,115 | Smith | July 29, 1952 |
| 2,650,103 | Oehler | Aug. 25, 1953 |

FOREIGN PATENTS

| | | |
|---|---|---|
| 127,557 | Australia | May 6, 1948 |
| 463,518 | France | Feb. 25, 1914 |
| 453,944 | Great Britain | Sept. 26, 1936 |
| 447,515 | Italy | Apr. 20, 1949 |